D. F. STAYMAN.
PACKING.
APPLICATION FILED AUG. 10, 1908.
950,519.
Patented Mar. 1, 1910.
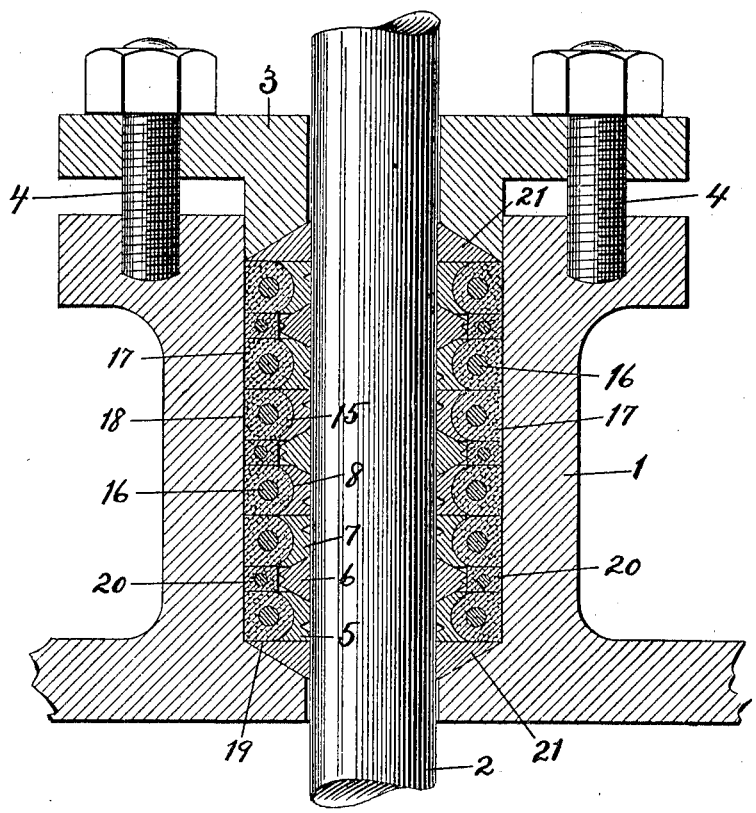
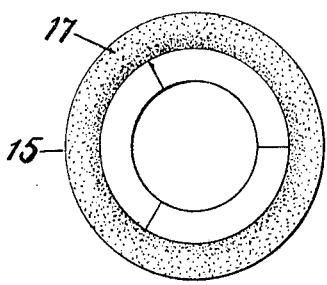
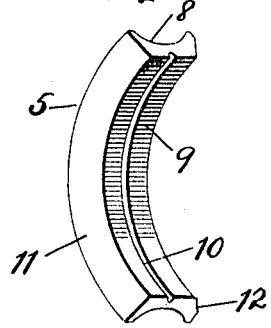
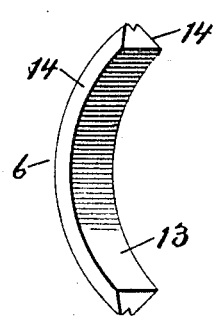
Witnesses
Edwin L. Bradford
G. Ferdinand Vogt
Inventor
David F. Stayman
By
Mann & Co,
Attorneys

UNITED STATES PATENT OFFICE.

DAVID F. STAYMAN, OF BALTIMORE, MARYLAND.

PACKING.

950,519.  Specification of Letters Patent.  Patented Mar. 1, 1910.

Application filed August 10, 1908. Serial No. 447,719.

*To all whom it may concern:*

Be it known that I, DAVID F. STAYMAN, a citizen of the United States, residing at Baltimore, in the State of Maryland, have invented certain new and useful Improvements in Packings, of which the following is a specification.

This invention relates to an improved packing ring for pistons, piston valves and rods, and has for its object to provide an improved construction of packing ring that will be effective and durable for a long time and which will be cheap to manufacture.

Another object is to provide a metallic packing ring that will be held in contact by an elastic medium which exerts a constant pressure against the outside of the ring which elastic medium will be protected from the direct action of the fluids it seeks to confine.

Another object is to provide an improved construction of packing whereby the slightest adjustment of the glands of the box will result in a closing of the packing around the rod.

With these and other objects in view the invention is illustrated in the accompanying drawing, in which,—

Figure 1, is a longitudinal sectional view through a stuffing box with a rod extending therethrough and shows the packing rings in position therein. Fig. 2, is a side view of one of the rings containing the compressible packing ring and embodying the features of my invention. Fig. 3, is a perspective view of one of the metallic ring sections, and Fig. 4 is a perspective view of another of the metallic ring sections.

Referring to the drawing the numeral, 1, designates a stuffing box through which the rod, 2, extends and which is provided with a gland, 3, and bolts, 4, for compressing the rings and packings to bring them into close contact about the rod to make a tight joint.

The packing is formed of a plurality of metallic rings, 5, 6, and, 7, which together form a set, and each ring of the set is made up or comprises a plurality of segmental sections, as shown in Figs. 2, 3 and 4. The sections forming the rings, 5, and, 7, are substantially alike and a description of one will be sufficient. The number of sections employed to complete the rings may vary but in the present instance the sections are of a size as to require three of them to complete the ring. Three rings are employed to each set,—the ring sections, 6, of each set being interposed between the ring sections, 5, and, 7, of the same set. The rings, 5, and, 7, are provided with an exterior grooved circumferential face, 8, and an interior curved face, 9, having a circumferential groove, 10. One side of each ring has a flat surface, 11, while the opposite side thereof is provided with a beveled or inclined surface, 12. The interposed ring, 6, of each set has position between the inclined or beveled surfaces of the rings, 5, and, 7, and said ring has a flat circumferential inner face, 13, and inclined or beveled opposite sides, 14, which latter confront, and contact with, the beveled surfaces, 12, of the rings, 5, and, 7. All of the ring sections of the packing are preferably formed of a suitable soft metal that will yield under pressure and which will accommodate itself to the body it is to surround.

When the ring sections of the several sets are assembled the grooves, 10, of the rings, 5, and, 7, will register and form a continuous groove around the inner circumference of the rings. These grooves serve to render the sections more pliable and enable the inner surface to yield and conform more readily to the body it surrounds, when pressure is applied to the outer circumference, and they also aid in distributing lubricant in case the body they surround is movable through the sections. The circumferential grooved face, 8, of the rings, 5, and, 7, form a seat for a suitable compressible packing ring, 15.

In practice I have found that a ring having a soft central elastic core, 16, such as rubber, with a covering, 17, of yielding but less elastic material will produce excellent results, being both durable and effective in that the core produces a constant inward pressure against the ring sections while at the same time it is protected from the direct action of heat or lubricant that might find its way to the covering, 17. I have also found from experience that by providing the packing rings, 15, with a flat outer circumference, 18, straight flat sides, 19, and a curved inner face to seat in the ring groove, 8, that the packing will respond to the slightest adjustment of the screws, 4, and gland, 3. Between the packing rings, 15, and formed in substantially the same manner, are smaller packing rings, 20, which surround the interposed metal ring, 6, and thus fill the space that would otherwise form between the rings, 5, and, 7. It will thus be seen that in the device shown in Fig. 1 the packing as a whole comprises three sets of rings and that each set is made up of the three sectional metal rings and three continuous packing rings extending circumferentially about the sectional metal rings. At opposite ends of the rings the box is provided with a washer-like filling, 21, between which the packing rings are compressed.

Having thus described my invention what I claim and desire to secure by Letters Patent is,—

1. A packing formed of a plural number of ring sets and each set comprising three sectional metal rings,—the end rings of each set having straight outer sides and beveled inner surfaces and the interposed ring having beveled opposite sides and a continuous packing ring extending circumferentially about each end ring of a set and a smaller packing ring extending circumferentially about the interposed metal ring.

2. A packing formed of a plural number of ring sets and each set comprising two sectional end rings with flat outer sides, beveled inner sides and a circumferential groove and an interposed metal ring also in each set and having beveled opposite sides; a continuous compressible packing ring around each end ring of a set and said packing rings having flat circumferential surfaces, straight opposite sides and curved inner faces to seat in the grooves of the end rings, and a smaller packing ring encircling the interposed metal ring of each set and having a flat circumferential surface and flat opposite sides.

In testimony whereof I affix my signature in presence of two witnesses.

DAVID F. STAYMAN.

Witnesses:
Louis F. Braun,
Chas. A. Conner.